(12) United States Patent
Reynolds et al.

(10) Patent No.: US 9,890,092 B1
(45) Date of Patent: *Feb. 13, 2018

(54) EXPLOSIVES MIMIC FOR TESTING, TRAINING, AND MONITORING

(71) Applicant: LAWRENCE LIVERMORE NATIONAL SECURITY, LLC, Livermore, CA (US)

(72) Inventors: John G. Reynolds, San Ramon, CA (US); Matthew M. Durban, Livermore, CA (US); Alexander E. Gash, Brentwood, CA (US); Michael D. Grapes, Livermore, CA (US); Ryan S. Kelley, Byron, CA (US); Kyle T. Sullivan, Brentwood, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/596,140

(22) Filed: May 16, 2017

(51) Int. Cl.
| | |
|---|---|
| C06B 45/14 | (2006.01) |
| D03D 23/00 | (2006.01) |
| D03D 43/00 | (2006.01) |
| B33Y 10/00 | (2015.01) |
| B33Y 80/00 | (2015.01) |
| B33Y 70/00 | (2015.01) |
| F41H 11/132 | (2011.01) |
| F41H 11/12 | (2011.01) |
| C06B 31/02 | (2006.01) |
| G09B 25/00 | (2006.01) |
| G09B 19/00 | (2006.01) |
| G09B 9/00 | (2006.01) |
| A01K 15/02 | (2006.01) |

(52) U.S. Cl.
CPC .............. *C06B 45/14* (2013.01); *A01K 15/02* (2013.01); *B33Y 10/00* (2014.12); *B33Y 70/00* (2014.12); *B33Y 80/00* (2014.12); *C06B 31/02* (2013.01); *F41H 11/12* (2013.01); *F41H 11/132* (2013.01); *G09B 9/00* (2013.01); *G09B 19/00* (2013.01); *G09B 25/00* (2013.01)

(58) Field of Classification Search
USPC .................................................. 149/15, 109.4
See application file for complete search history.

(56) References Cited

U.S. PATENT DOCUMENTS

| | | |
|---|---|---|
| 5,359,936 A | 11/1994 | Simpson et al. |
| 5,413,812 A | 5/1995 | Simpson et al. |
| 5,648,636 A | 7/1997 | Simpson et al. |
| 5,958,299 A | 9/1999 | Kury et al. |
| 8,444,881 B2 | 5/2013 | Adebimpe |
| 9,108,890 B2 * | 8/2015 | Vu .......................... C06B 21/00 |
| 2006/0037509 A1 * | 2/2006 | Kneisl ..................... A01K 15/02 102/355 |
| 2015/0056913 A1 | 2/2015 | Foat et al. |

OTHER PUBLICATIONS

Levine, "The Education of a Bomb Dog," Smithsonian, 2013, 1 page.

* cited by examiner

*Primary Examiner* — James McDonough
(74) *Attorney, Agent, or Firm* — Eddie E. Scott

(57) ABSTRACT

Additive Manufacturing (AM) is used to make mimics for explosives. The process uses mixtures of explosives and matrices commonly used in AM. The explosives are formulated into a mixture with the matrix and printed using AM techniques and equipment. The explosive concentrations are kept less than 10% by wt. of the mixture to conform to requirements of shipping and handling.

20 Claims, 3 Drawing Sheets

EXPLOSIVES MIMIC FOR TESTING, TRAINING, AND MONITORING

STATEMENT AS TO RIGHTS TO APPLICATIONS MADE UNDER FEDERALLY SPONSORED RESEARCH AND DEVELOPMENT

The United States Government has rights in this application pursuant to Contract No. DE-AC52-07NA27344 between the United States Department of Energy and Lawrence Livermore National Security, LLC for the operation of Lawrence Livermore National Laboratory.

BACKGROUND

Field of Endeavor

The present application relates to testing, training, and monitoring and more particularly to an explosives mimic for testing, training, and monitoring.

State of Technology

This section provides background information related to the present disclosure which is not necessarily prior art.

U.S. Pat. No. 5,958,299 for explosive simulants for testing explosive detection systems issued Sep. 28, 1999 provides the state of technology information reproduced below.

The Federal Aviation Administration (FAA) has used explosive simulants for many years to field test various automated explosive detection systems embedded within baggage inspection systems at airports, and to train the operators of this equipment. The FAA develops and validates training aids for baggage inspectors and hand-searchers to help them distinguish threats from false alarms. The best explosive simulant is a physical model that imitates selected attributes of the more complex, real-world system. Simulators are particularly useful to hone, test, and evaluate the abilities of personnel and equipment when a real-world environment is too costly or not available.

U.S. Pat. No. 9,108,890 for process for producing non-detonable training aid materials for detecting explosives issued Aug. 18, 2015 provides the state of technology information reproduced below.

Non-detonable training aid materials have been developed for allowing training of explosives detection dogs (EDD), dolphins, or other living or non-living entities that can detect presence of explosives through emitted vapors. The training aid materials desirably exude the same odor as bulk quantities of real explosives, but lack the detonable properties of real explosives and are otherwise safe to handle. Furthermore, the training aid materials can preferably produce vapors that exude the odor for at least a specific period of time after opening the package (e.g., 2 hours). Such training aid materials have been developed for peroxide-based homemade explosives (HME) allowing for training EDDs to detect such explosives in various environments.

Some training aid materials are formed by coating materials with layers of the explosive molecules as dissolved in a solvent. These materials can similarly produce off-odors, however, due to addition of the solvent.

SUMMARY

Features and advantages of the disclosed apparatus, systems, and methods will become apparent from the following description. Applicant is providing this description, which includes drawings and examples of specific embodiments, to give a broad representation of the apparatus, systems, and methods. Various changes and modifications within the spirit and scope of the application will become apparent to those skilled in the art from this description and by practice of the apparatus, systems, and methods. The scope of the apparatus, systems, and methods is not intended to be limited to the particular forms disclosed and the application covers all modifications, equivalents, and alternatives falling within the spirit and scope of the apparatus, systems, and methods as defined by the claims.

Additive Manufacturing (AM) is used to make an explosives mimic for testing, training, or monitoring. The process uses mixtures of explosives and matrices commonly used in AM. The explosives are formulated into a mixture using AM techniques and equipment. The explosive concentrations are kept less than 10% by wt. of the mixture to conform to requirements of shipping and handling, although higher concentrations of explosives are viable. The matrices vary but the most desirable are those that have no volatile compound signatures after processing. The explosives mimic for testing, training, or monitoring is printed in a variety of form and shapes, consistent with meeting K-9 training protocols.

In general, the inventors' apparatus, systems, and methods utilizes the technology of AM printing to produce unusual materials with special properties. Explosives mimics have to minimally meet the following requirements: 1) low concentration of explosive or explosive mixture (this allows handling and transportation without special requirements); 2) non-volatile matrix (so K-9s will not be trained on a false signature); 3) flexibility in form (so the aid can be used in various configurations and applications). Current technology meets some of these requirements. There are companies (few), such as NESTT and ScentLogic, that produce mimic for explosives that can be shipped and handled normally, but the list of explosives is somewhat limited, including no real improvised explosive mixtures. Matrices are available, but these are usually limited to silica and thick gel hydrocarbons. The flexibility of form is also limited as the current aids are generally pastes or powders that must have secondary containment, such as a bag, or applied as a smear.

AM printed mimic for explosives have many advantages over current explosives mimics. They can be printed in low concentrations to meet DOT requirements as non-hazardous, non-explosive materials. They can be printed in any shape, such as a box or hand grenade. They can be printed with a large variety of matrices that are more realistic to actual threat environments, such as clays, ceramics, plastics. They can be printed then processed with little or no volatile backgrounds, for example, several printing formulations are water based. They can be printed with a large array of different explosive materials. The open porous structure allows ample access of inner concentrations of explosives. They can be printed as laminates with two components of an improvised explosive (oxidizer and fuel) without the components being mixed or co-mingled. They can be printed on-demand. With possible selection of printing equipment, they could be printed in the field. They could be printed with other illicit target materials so they could be used as mimics for testing, training, or monitoring for drugs, chemical weapons, and environmental hazards.

The apparatus, systems, and methods are susceptible to modifications and alternative forms. Specific embodiments are shown by way of example. It is to be understood that the apparatus, systems, and methods are not limited to the particular forms disclosed. The apparatus, systems, and methods cover all modifications, equivalents, and alternatives falling within the spirit and scope of the application as defined by the claims.

BRIEF DESCRIPTION OF THE DRAWINGS

The accompanying drawings, which are incorporated into and constitute a part of the specification, illustrate specific embodiments of the apparatus, systems, and methods and, together with the general description given above, and the detailed description of the specific embodiments, serve to explain the principles of the apparatus, systems, and methods.

DETAILED DESCRIPTION OF SPECIFIC EMBODIMENTS

Figure 1:
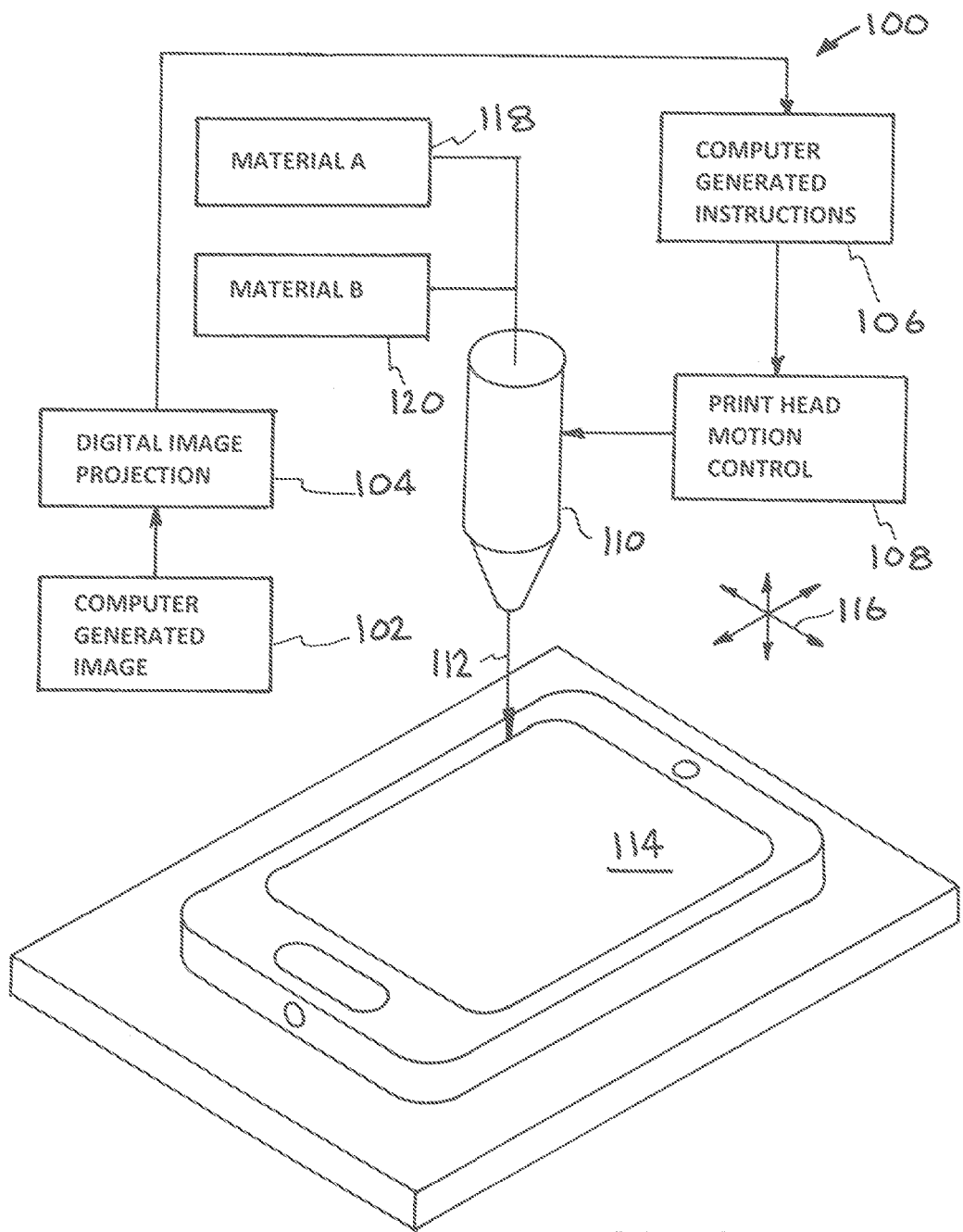
FIG. 1 illustrates one embodiment of the inventors' apparatus, systems, and methods using AM to make mimics of explosives.

Referring to the drawings, to the following detailed description, and to incorporated materials, detailed information about the apparatus, systems, and methods is provided including the description of specific embodiments. The detailed description serves to explain the principles of the apparatus, systems, and methods. The apparatus, systems, and methods are susceptible to modifications and alternative forms. The application is not limited to the particular forms disclosed. The application covers all modifications, equivalents, and alternatives falling within the spirit and scope of the apparatus, systems, and methods as defined by the claims.

The inventors have been involved in AM research technology for some time. Various research efforts have led the inventors to accumulate vast expertise in AM as adapted to security applications. Recently, the application of AM printing explosives has come to fruition. Developing safe handling and manufacturing methods and adapting formulation to include explosives has been recently successful. This technology is only possible because of the long history of the inventors working with explosives on many different levels, and knowledge of the safe handling and formulation of explosives in general. Combining AM with the safe guards of handling explosives was a natural extension to produce the mimic for explosives focus.

Referring now to the drawings, and in particular to FIG. 1, an illustration shows one embodiment of the inventors' apparatus, systems, and methods using AM to make mimics of explosives that can be used in the testing, training, and monitoring of explosives by detection systems, including K-9 detection of explosives. The embodiment is designated generally by the reference numeral 100. The embodiment 100 uses AM in at least one step of a process to produce a mimic of explosives. The embodiment 100 provides an AM system for selectively processing feedstock materials in a layer-by-layer process to produce the mimic of explosives. Processing includes, but is not limited to, producing a computer-generated image 102 of the mimic of explosives to be produced, projecting a digital image 104 of the mimic of explosives, using a computer 106 to provide print head motion control 108 to a print head 110 that is moved as indicated by the arrows 116 to provide an extrusion 112 and build the mimic of explosives 114. Feed stocks of Material A 118 or Material B 120 are fed to the print head 110 to produce the layers being printed. In other variations, the print head is fixed and the carriage is moved relative to the print head.

Initially a 3D model of the desired product (mimic of explosives 114) is designed by any suitable method, e.g., by bit mapping or by computer aided design (CAD) software at a PC/controller. The CAD model of the desired product (mimic of explosives 114) is electronically sliced into series of 2-dimensional data files, i.e. 2D layers, each defining a planar cross section through the model of the desired product. The sliced layer thickness can vary depending on the spatial resolution of layer printing. The digital images are used in the AM system 100 to produce the final product. The digital images provide a digital image projection 104 of each layer. The digital image projection 104 is fed to a computer that provides computer generated instructions 106. The computer-generated instructions 106 are fed to a print head motion control 108 that moves the print head 110. Layers of the feedstock (Material A 118 or Material B 120) are printed sequentially onto a substrate in a layer by layer process to produce the final product (mimic of explosives 114).

Figure 2:
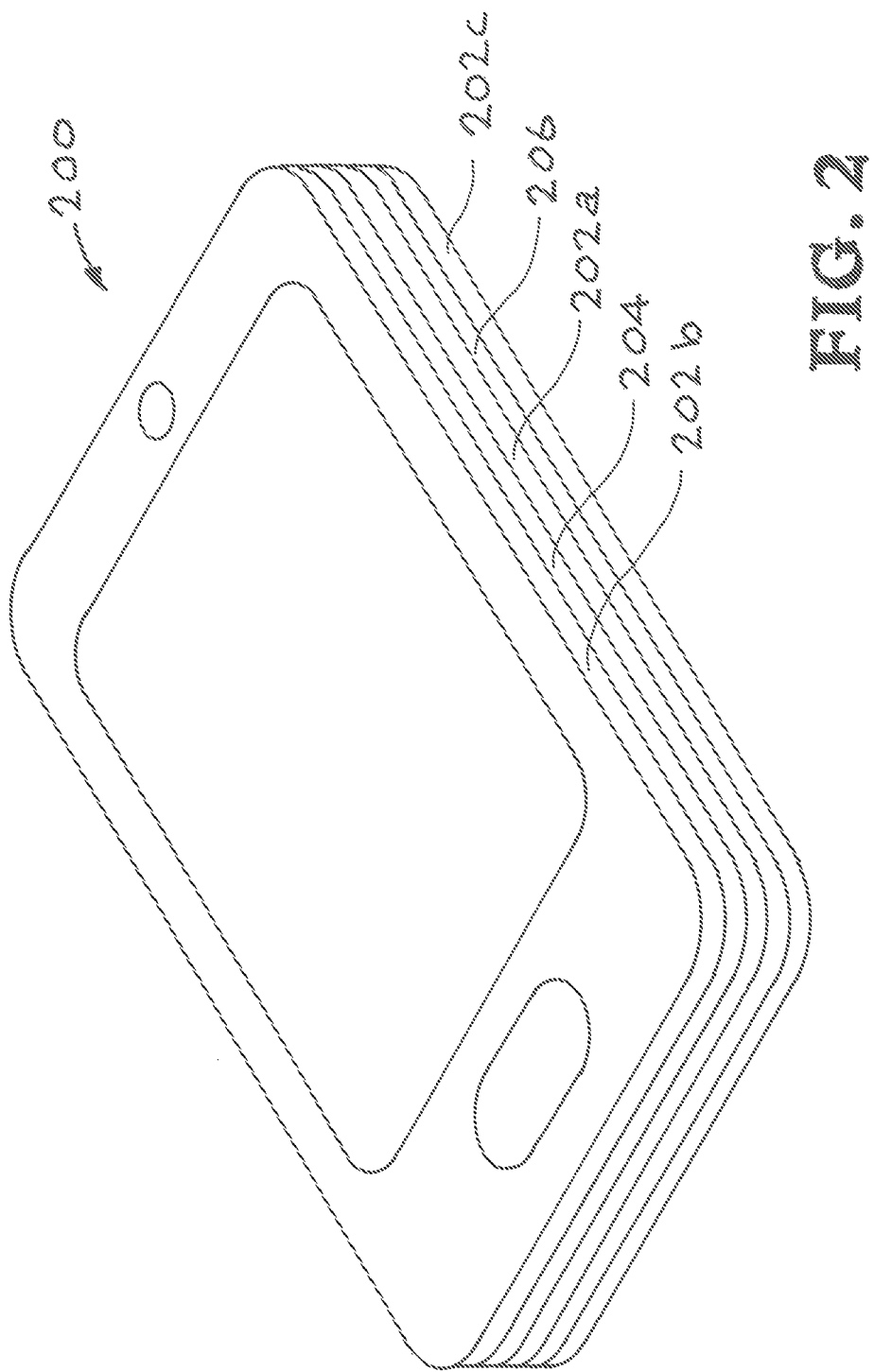
FIG. 2 illustrates an example of an additive manufactured mimic of explosives that can be used in the testing, training, and monitoring of explosives.

Referring to FIG. 2 an example of an additive manufactured mimic of explosives that can be used in the testing, training, and monitoring of explosives is illustrated. This example is designated generally by the reference numeral 200. The mimic of explosives illustrated in FIG. 2 has many advantages. It can be printed in low concentrations to meet DOT requirements as non-hazardous, non-explosive materials. It can be printed in any shape, such as a cell phone, box or hand grenade. It can be printed with a large variety of matrices that are more realistic to actual threat environments, such as clays, ceramics, plastics. It can be printed with a large array of different explosive materials. The mimic of explosives can be printed as laminates with two components of an improvised explosive (oxidizer and fuel) without the components being mixed or co-mingled. The mimic of explosives can be printed on-demand. With possible selection of printing equipment, the mimic of explosives can be printed in the field. Also, the mimic of explosives could be printed with other illicit target materials so they could be used drugs, chemical weapons, and environmental hazards.

The mimic for explosives 200 illustrated in FIG. 2 has an inner inert layer 202a that separates an oxidizer layer 204 from a fuel layer 206. An upper inert layer 202b and a lower inert layer 202c covers and seals the oxidizer layer 204 and the fuel layer 206. The oxidizer layer 204 and the fuel layer 206 can be varied in concentration to conform to requirements of shipping and handling. The mimic for explosives 200 is classified as non-hazardous material.

The first layer 202b is be an inert separator material. The second layer 204, for example, can be an oxidizer. The third layer 202a is be an inert separator material. The fourth layer 206, for example, can be a fuel. The fifth layer 202c is be an inert separator material. The printing process prints the second layer 204 and the fourth layer 206 separated by the third layer 202a made of an inert separator material. The second, third, and fourth layers are encased in inert separator materials layers 202b and 202c. Examples of the second oxidizer layer 204 and the fourth fuel layer 206 include those listed below. The explosive concentrations are kept less than 10% by wt. of the mixture to conform to requirements of shipping and handling.

Example 1

First Layer—Oxidizer 204—Ammonium Nitrate
Fourth Layer—Fuel 206—Fuel Oil

Example 2

First Layer—Oxidizer 204—Potassium Perchlorate
Fourth Layer—Fuel 206—Powdered Sugar

Example 3

First Layer—Oxidizer 204—Potassium Nitrate
Fourth Layer—Fuel 206—Sulfur

Figure 3A:
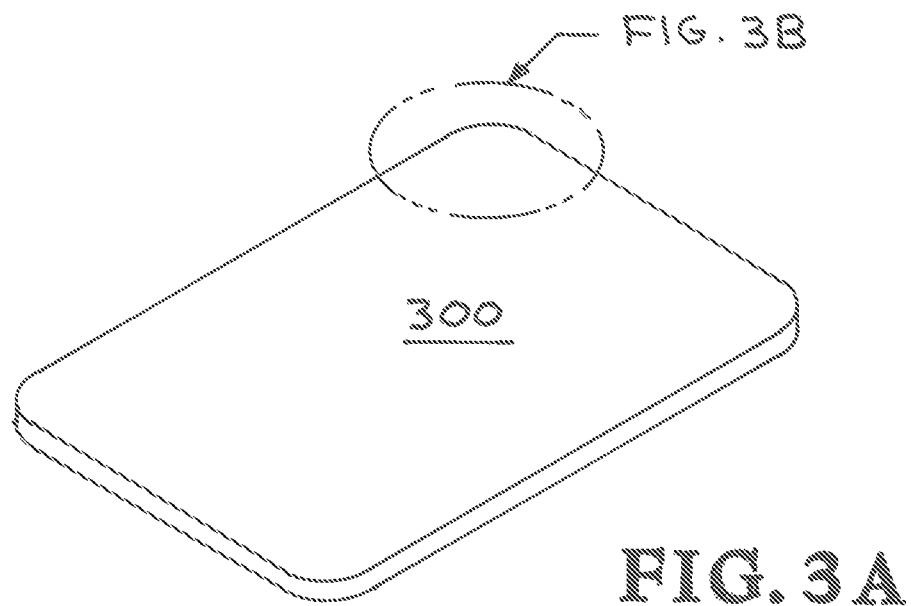
FIGS. 3A and 3B provide more details of the mimic for explosives produced by the AM system illustrated in FIG. 1.
Figure 3B:
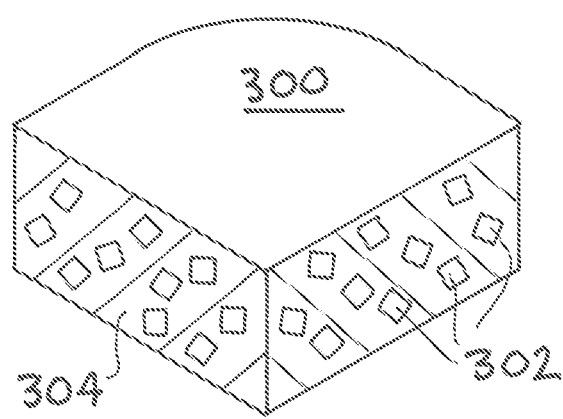

FIGS. 3A and 3B provide more details of the mimic for explosives produced by the AM system illustrated in FIG. 1. The mimic for explosives is designated generally by the reference numeral 300.

FIG. 3A shows the mimic for explosives 300 with the portion in the circle illustrated in greater detail in FIG. 3B. The material 304 is a separator material that produces the body portion of the mimic for explosives 300. The material 302 is explosive material in the form of standard commercial and military explosives. The explosive material 302 can include the following:

Military Explosives

C4
HMX
PETN
RDX
Semtex

Commercial Explosives

ANAL
ANFO
Black Powder
Dynamite
Nitroglycerin
Smokeless Powder
TNT
Urea Nitrate

The explosive material 302 is positioned in separate allocates of the explosives separated from one another in the body portion of the mimic for explosives 300. The explosive material 302 constitutes less than 10% of the mimic for explosives 300. The explosive concentration is kept less than 10% by wt. of the mimic for explosives to conform to requirements of shipping and handling. The mimic for explosives 300 is printed in low concentrations to meet DOT requirements as non-hazardous, non-explosive materials. The explosives 302 are isolated in the inert separator material 304.

Although the description above contains many details and specifics, these should not be construed as limiting the scope of the application but as merely providing illustrations of some of the presently preferred embodiments of the apparatus, systems, and methods. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present application fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present apparatus, systems, and methods, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the apparatus, systems, and methods may be susceptible to various modifications and alternative forms, specific embodiments have been shown by way of example in the drawings and have been described in detail herein. However, it should be understood that the application is not intended to be limited to the particular forms disclosed. Rather, the application is to cover all modifications, equivalents, and alternatives falling within the spirit and scope of the application as defined by the following appended claims.

The claims are:

1. An explosives mimic apparatus for testing, training, or monitoring; comprising:
    an explosives mimic having multiple components;
    an explosive material component comprising one of said components, wherein said explosive material component comprising one of said components includes a layer made of an oxidizer material and a layer made of a fuel material; and
    a separator material component comprising another of said components.

2. The explosives mimic apparatus for testing, training, or monitoring of claim 1 wherein said layer made of an oxidizer material is an additive manufactured layer made of an oxidizer material and wherein said layer made of a fuel material is an additive manufactured layer made of a fuel material.

3. The explosives mimic apparatus for testing, training, or monitoring of claim 2 wherein said additive manufactured layer made of an oxidizer material is less than ten percent of the apparatus by weight.

4. The explosives mimic apparatus for testing, training, or monitoring of claim 2 wherein said additive manufactured layer made of a fuel material is less than ten percent of the apparatus by weight.

5. The explosives mimic apparatus for testing, training, or monitoring of claim 2 wherein said additive manufactured layer made of an oxidizer material comprises potassium nitrate.

6. The explosives mimic apparatus for testing, training, or monitoring of claim 2 wherein said additive manufactured layer made of a fuel material comprises sulfur.

7. The explosives mimic apparatus for testing, training, or monitoring of claim 1 wherein said explosive material component comprising one of said components is less than ten percent of the apparatus by weight.

8. An explosives mimic apparatus for testing, training, or monitoring, comprising:
   an additive manufactured layer made of an oxidizer material,
   an additive manufactured layer made of a fuel material, and
   an additive manufactured layer made of an inert material that separates said layer made of an oxidizer material and said layer made of a fuel material.

9. The explosives mimic apparatus for testing, training, or monitoring of claim 8 wherein said additive manufactured layer made of an oxidizer material is less than 10% by weight.

10. The explosives mimic apparatus for testing, training, or monitoring of claim 8 wherein said additive manufactured layer made of a fuel material is less than 10% by weight.

11. The explosives mimic apparatus for testing, training, or monitoring of claim 8 wherein said additive manufactured layer made of an oxidizer material comprises potassium nitrate.

12. The explosives mimic apparatus for testing, training, or monitoring of claim 8 wherein said additive manufactured layer made of a fuel material comprises sulfur.

13. An explosives mimic apparatus for testing, training, or monitoring; comprising:
   an additive manufactured layer made of an oxidizer material,
   an additive manufactured layer made of a fuel material, and
   an additive manufactured layer made of an inert material that separates said layer made of an oxidizer material and said layer made of a fuel material.

14. The explosives mimic apparatus for testing, training, or monitoring of claim 13 wherein said additive manufactured layer made of an oxidizer material is less than 10% by weight.

15. The explosives mimic apparatus for testing, training, or monitoring of claim 13 wherein said additive manufactured layer made of a fuel material is less than 10% by weight.

16. The explosives mimic apparatus for testing, training, or monitoring of claim 13 wherein said additive manufactured layer made of an oxidizer material comprises potassium nitrate.

17. The explosives mimic apparatus for testing, training, or monitoring of claim 13 wherein said additive manufactured layer made of a fuel material comprises sulfur.

18. A method of making an explosives mimic apparatus for testing, training, or monitoring comprising the steps of:
   printing a first layer made of an oxidizer material,
   printing a second layer made of a fuel material, and
   printing a third layer made of an inert material that separates said layer made of an oxidizer material and said layer made of a fuel material.

19. The method of making an explosives mimic apparatus for testing, training, or monitoring of claim 18 wherein said additive manufactured layer made of an oxidizer material is less than 10% by weight.

20. The method of making an explosives mimic apparatus for testing, training, or monitoring of claim 18 wherein said additive manufactured layer made of a fuel material is less than 10% by weight.

* * * * *